US007585462B2

(12) United States Patent
Parng

(10) Patent No.: US 7,585,462 B2
(45) Date of Patent: Sep. 8, 2009

(54) BIOCHIP WITH MICROCHANNELS

(75) Inventor: Shaw-Hwa Parng, Fongshan (TW)

(73) Assignee: Industrial Technology Research Institute, Hsinchu (TW)

( * ) Notice: Subject to any disclaimer, the term of this patent is extended or adjusted under 35 U.S.C. 154(b) by 759 days.

(21) Appl. No.: 11/270,142

(22) Filed: Nov. 8, 2005

(65) Prior Publication Data

US 2007/0080976 A1 Apr. 12, 2007

(30) Foreign Application Priority Data

Oct. 11, 2005 (TW) ............................. 94135333 A

(51) Int. Cl.
*G01N 21/00* (2006.01)

(52) U.S. Cl. ........................................................ 422/58

(58) Field of Classification Search .................... 422/58
See application file for complete search history.

(56) References Cited

U.S. PATENT DOCUMENTS

| | | | | |
|---|---|---|---|---|
| 6,296,020 | B1 | 10/2001 | McNeely et al. | 137/806 |
| 6,418,968 | B1 | 7/2002 | Pezzuto et al. | 137/833 |
| 6,503,381 | B1 | 1/2003 | Gotoh et al. | 304/403.14 |
| 6,729,352 | B2 | 5/2004 | O'Connor et al. | 137/827 |
| 6,845,787 | B2 | 1/2005 | Karp et al. | 137/833 |

FOREIGN PATENT DOCUMENTS

| | | |
|---|---|---|
| TW | 565692 | 12/2003 |
| TW | 571098 | 1/2004 |

OTHER PUBLICATIONS

"Characterization of Neural Cells for Cell Sorting Using Flow Induced Electrical Admittance Spectra in Microfluidics" J. Collins et al. / Sep. 26-30, 2004, 8$^{th}$ International Conference on Miniaturized Systems for Chemistry and Life Sciences / pp. 363-365.

"Rapid Prototyping of Microfluidic Systems in Poly(idmethylsiloxane)" David C. Duffy et al. / Dec. 1, 1998, Analytical Chemistry, vol. 70, No. 23 / pp. 4974-4984.

"Single-Cell Analysis by a Scanning Thermal Lens Microscope with a Microchip: Direct Monitoring of Cytochrome c Distribution during Apoptosis Process" Eiichiro Tamaki et al. / Apr. 1, 2002, Analytical Chemistry, vol. 74, No. 7 / pp. 1560-1564.

*Primary Examiner*—Walter D Griffin
*Assistant Examiner*—Bobby Ramdhanie
(74) *Attorney, Agent, or Firm*—J.C. Patents

(57) ABSTRACT

A biochip with multiple microchannels is provided. Due to the sloped microchannels, the fluids in the microchannels flow at substantially the same rate, thus facilitating cellular experiments of potential medicaments. Since the flow resistance of the sloped microchannels changes gradually, the fluids can flow in the microchannels without retention and the reagents react consistently with the cells in the microchannels. Hence, the cellular reaction time for the reagents in the microchannels can be correctly determined. Moreover, the biochip of this invention further includes at least one multi-splitter to control the influx or efflux of the fluids.

18 Claims, 5 Drawing Sheets

BIOCHIP WITH MICROCHANNELS

CROSS-REFERENCE TO RELATED APPLICATION

This application claims the priority benefit of Taiwan application serial no. 94135333, filed on Oct. 11, 2005. All disclosure of the Taiwan application is incorporated herein by reference.

BACKGROUND OF THE INVENTION

1. Field of Invention

The present invention relates to a biochip structure, and particularly to a biochip with a plurality of microchannels.

2. Description of the Related Art

The cell is the fundamental unit of living organisms and has a sophisticated structure with complex biochemical reactions, which make artificial imitating or cloning a cell almost impossible. The cell plays a very important role in pharmacy developments. Due to the interaction between the medicament and the cell and the subsequent series of changes in cell morphology and cellular metabolism, it is able to speculate the functionary mechanism of a medicament and to evaluate activity and toxicity of a medicament through experiments of a medicament on cells. Due to the complexity of a human body system, the influences of applying certain medicaments on a human body are normally first experimented in a cell-level. The cells used for experiments provide many advantages, such as reaction-directness, high susceptivity and observation convenience and researchers can usually deduct a possible functionary mechanism of the medicament in the human body from the cellular responses. In this regard, it is useful for the pharmacy industry today to use incubated cells for researches and developments of target medicaments.

The benefits of miniaturization on biochemical experiments include quantitative accuracy, smaller amounts of samples, single observation for diverse reactions and easy automation. Since the miniaturization technique has been full-grown today, many traditional incubators are gradually replaced by minimized biochips, where cells are incubated in the biochip with microchannels for evaluating the actions of the medicament in the specific kind of cells. Generally, the cells are incubated in the microchannels of the biochip and a liquid containing a testing medicament is injected to the microchannels. During the flow of the liquid, the medicament reacts with the cells. Hence, by observing the cells afterward, the stimulating or action mechanism of the medicament on the cells are evaluated. To prevent the testing medicament from being diffused the microchannels and eliminate possible adverse influences in the reaction time of the testing medicament, the medicament is usually enfolded by bubbles first and then transported. In this way, the desired action time of the medicament on the cells are precisely controlled.

The key problem of the biochip with microchannels is how to enable the liquid therein to move simultaneously at a plurality of microchannels. Although the conventional biochip with microchannels use a flow-sharing scheme (so-called stepwise model) for the liquid flow that the geometric changes encountered during liquid's filling in the microchannels allows the liquid at different microchannels to await for each other. However, the liquid does not pass through each channel at the same time, and the goal of simultaneously observing all the microchannels for processing is unfeasible. Another solution with the prior art is to provide a biochip assembled by laminar plates and porous membrane valves, which is not suitable for the disposable design due to the expensive costs thereof.

SUMMARY OF THE INVENTION

An object of the present invention is to provide a biochip with microchannels. Because of the sloped microchannels, the fluids in the microchannels flow at substantially the same rate, thus facilitating cellular experiments of potential medicaments. Since the flow resistance of the sloped microchannels changes gradually, the fluids can flow in the microchannels without retention and the reagents react consistently with the cells in the microchannels. Hence, the cellular reaction time for the reagents in the microchannels can be correctly determined. Moreover, the biochip of this invention further includes at least one multi-splitter to control the influx or efflux of the fluids.

Another object of the present invention is to provide a biochip with microchannels and incorporated with at least one multi-splitter. The multi-splitter includes a plurality of channels in different depths, so that the fluid can evenly flows into the microchannels in a flow-sharing manner. The microchannels can be designed to have a flat slope or a positive slope and the microchannels can serve as platforms for testing a specific medicament on cells.

The present invention provides a biochip with microchannels, which includes at least a substrate having a top surface and a bottom surface and a lid covering the top surface of the substrate. The microchannels are arranged in parallel and each microchannel has an inlet and an outlet at both ends thereof, respectively. The inlet and the outlet are respectively connected to a splitting pool and a collection pool residing on the top surface of the substrate. A liquid flows into the splitting pool via an inflow mouth, passes through the microchannels and then flows out from an outflow mouth. The microchannels may be designed to have a positive slope, namely the inlet of the microchannels is deeper than the outlet of the microchannels.

According to the embodiment of the present invention, the splitting pool further includes a multi-splitter with a plurality of channels in different depths to enable the fluid to evenly flow into the microchannels in a flow-sharing manner. While the collection pool further includes a multi-splitter with a plurality of channels in different depths for equilibrium.

The present invention provides a biochip with microchannels, which includes at least a substrate having a top surface and a bottom surface and a lid covering the top surface of the substrate. The substrate includes a plurality of microchannels formed on the top surface of the substrate. Wherein, each microchannel has an inlet and an outlet at both ends thereof, respectively. The inlet and the outlet are connected to a splitting pool and a collection pool residing on the top surface of the substrate, respectively. A liquid flows into the splitting pool via an inflow mouth, passes through the microchannels and then flows out of an outlet. Wherein, the splitting pool includes a multi-splitter with a plurality of channels in different depths to enable the liquid to evenly flow into the microchannels.

According to the embodiment of the present invention, the microchannels have a positive slope. Alternatively, the microchannels can have a flat slope as well.

The microchannels are either linear or curved and arranged in parallel to each other.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The present invention provides a biochip with microchannels, which includes at least a substrate having a top surface and a bottom surface and a lid covering the top surface of the substrate. The substrate includes a plurality of microchannels formed on the top surface of the substrate.

Figure 1A:
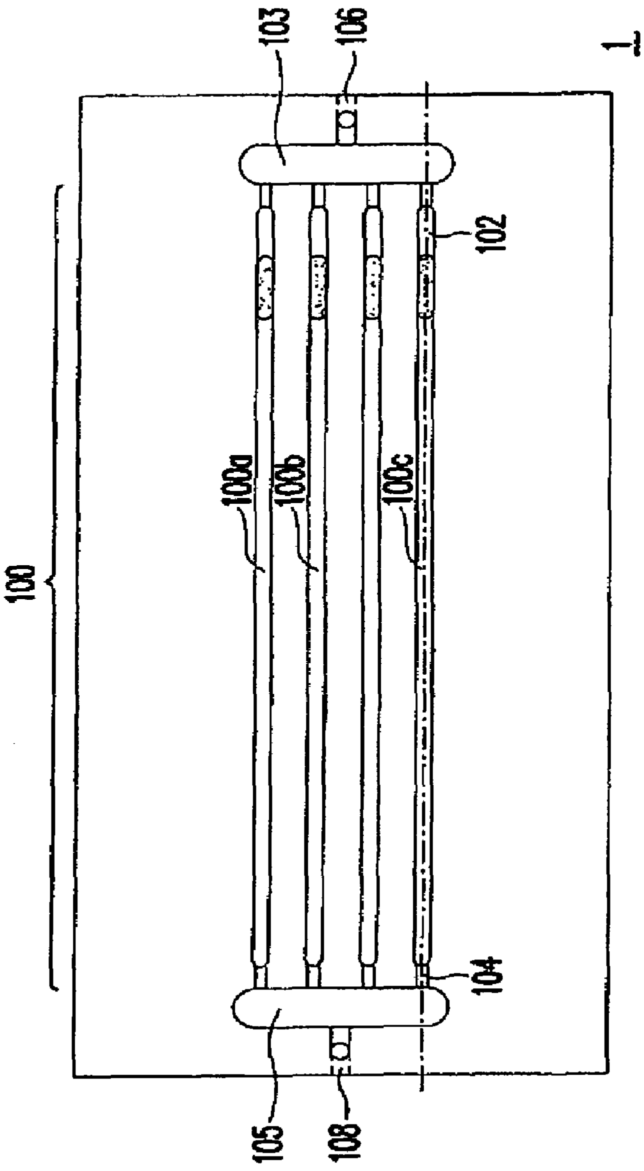
FIG. 1A is the schematic top view of a biochip having microchannels of three different slopes according to the present invention.

To investigate the influences of different slopes on the liquid in the microchannels, the biochip with microchannels of three different slopes, namely the microchannels of a positive slope, a flat slope (the slope being zero) and a negative slope, is provided by the present invention. FIG. 1A is the schematic top view of a biochip having microchannels of three different slopes in the present invention. While FIG. 1B is the schematic section view of the biochip of FIG. 1A showing the part of a microchannel with a positive slope.

Figure 1B:
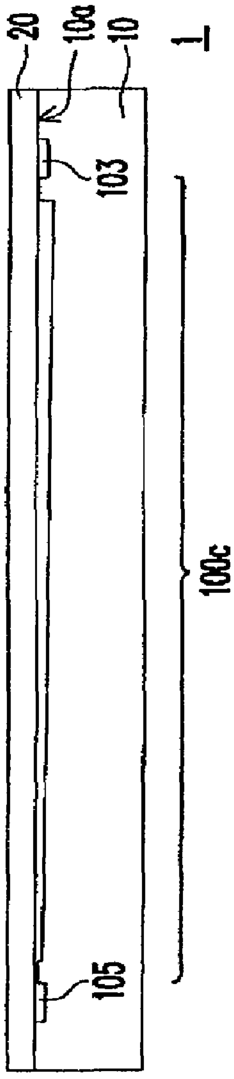
FIG. 1B is the schematic section view of the biochip of FIG. 1A showing the part of a microchannel with a positive slope.

As shown in FIG. 1B, the biochip 1 includes at least a substrate 10 and a lid 20 covering the top surface 10*a* of the substrate 10. The material of the substrate 10 is, for example, plastic and preferably polystyrene (PS). The lid 20 is made of a transparent material with biological compatibility, for example, polydimethylsiloxane (PDMS), which is an elastic, transparent polymer material. If PDMS is used as the material of the lid for the biochip with microchannels, the elastic, transparent PDMS material is able to adhere to the plastic substrate plate and provides resilient characteristics beneficial for injecting a medicament directly through the lid without leakage. Also, observation of the fluid through the transparent lid is possible.

As shown in FIG. 1A, the top surface 10*a* of the substrate 10 has a plurality of microchannels 100, which include microchannels 100*a* with a negative slope, microchannels 100*b* with a flat slope (the slope being zero) and microchannels 100*c* with a positive slope.

The slope of microchannels in the present invention is indicated by an angleθ, which can be expressed as follows:

$$\tan\theta = \Delta H/\Delta X$$

where ΔH indicates the depth difference between the inlet and the outlet, while ΔX indicates length of the microchannels, i.e. the fluid traveling distance.

The slope of the microchannels (angleθ) is between 0.01° and 10°, and preferably between 0.1° and 3° is preferred.

In FIGS. 1A and 1B, the microchannels 100*a* with a negative slope has a θ of ±0.6°, the microchannels 100*b* with a flat slope has a θ of 0° and the microchannels 100*c* with a positive slope has a θ of 0.6°. The microchannels 100 serve as cell incubating areas and the width of the microchannels 100 is between 10 μm (micron) and 3 mm.

Each microchannel 100 has an inlet 102 and an outlet 104 at both ends thereof, respectively. The inlet 102 and the outlet 104 are respectively connected to a splitting pool 103 and a collection pool 105 on the top surface of the substrate 10. The liquid flows into the splitting pool 103 via an inflow mouth 106, passes through the microchannels 100 and arrives at the collection pool 105, then flows out of an outflow mouth 108. The fluid can temporally dwell in the splitting pool 103, while the liquid conflux into the collection pool 105 as a waste to be collected. On the other hands, the inflow mouth 106 and the outflow mouth 108 disposed at the right side and the left of the chip, respectively, are used for introducing the liquid into the microchannels of the chip and discharging the waste liquid conveniently.

Within the liquid, bubbles in a length of around 5 mm are injected (shown as the shading area). The bubbles are observed to evaluate how the liquid propels the bubbles in the microchannels with different slopes. The experimental results are given in FIGS. 2A and 2B.

Figure 2A:
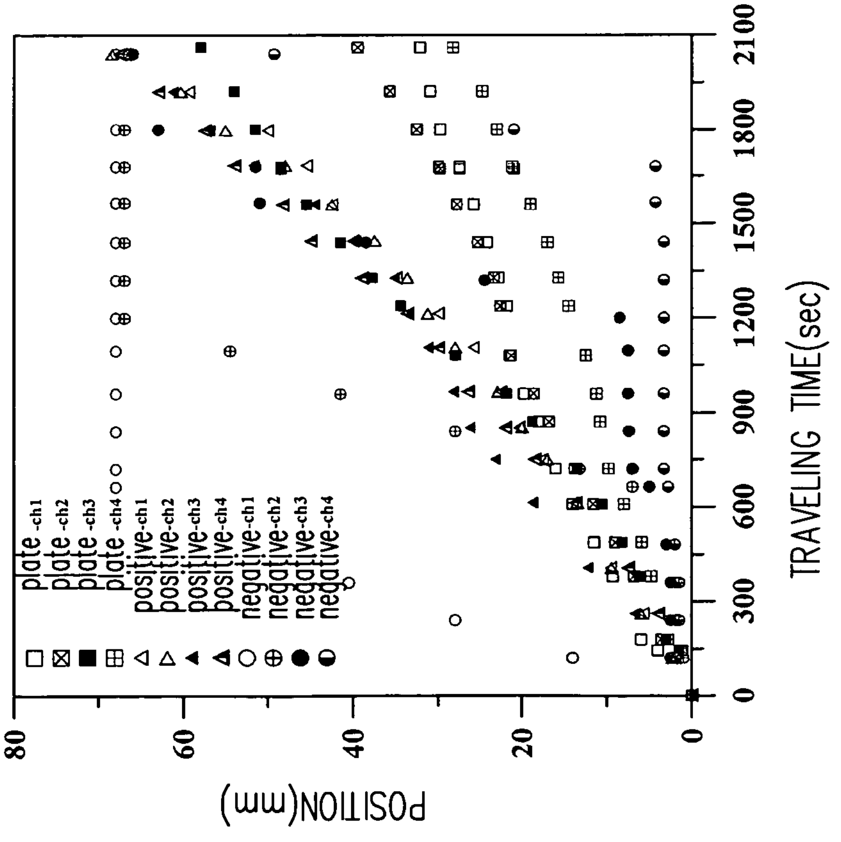
FIG. 2A is a chart showing a relationship of the positions of microchannels with various slopes versus the traveling time.
Figure 2B:
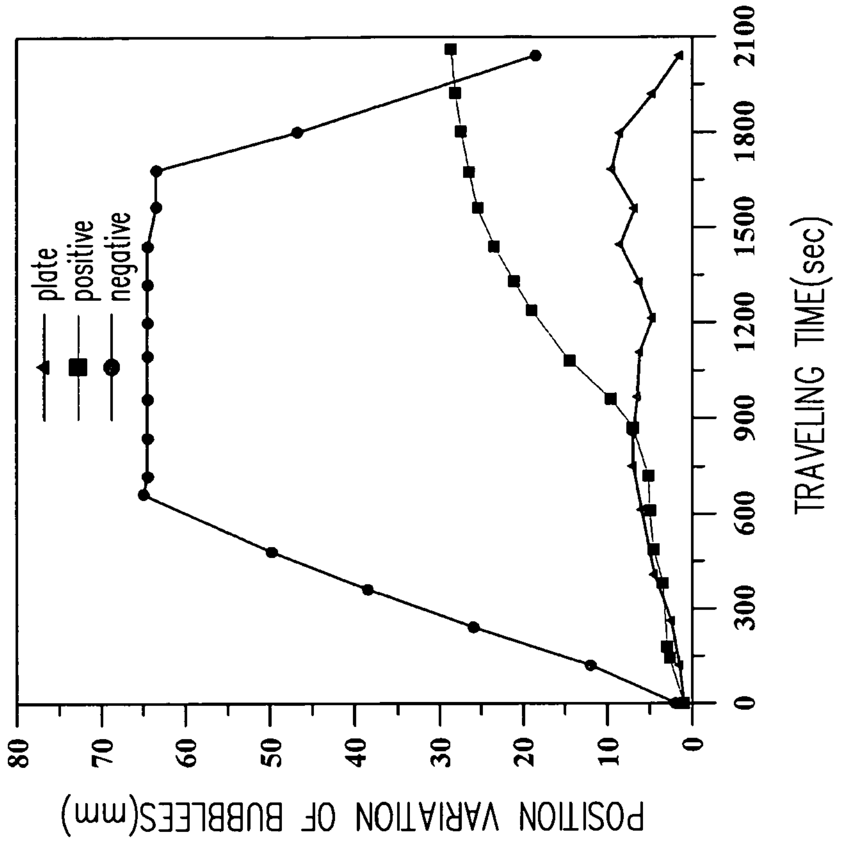
FIG. 2B is a chart showing a relationship of the position variations between bubbles in microchannels with various slopes versus the traveling time.

FIG. 2A is a chart showing a relationship between the positions of microchannels with various slopes and the traveling time. FIG. 2B is a chart showing a relationship of the position variations of bubbles in microchannels with various slopes versus the traveling time. The flow equilibrium in microchannels with a positive slope is counted as steady-state equilibrium, where any disturbance can be easily compensated to minimize flow differences, if occurs, between the microchannels. The flow equilibrium in microchannels with a flat slope is counted as random equilibrium. The flow equilibrium in microchannels with a negative slope is counted as transient equilibrium, where once disturbances occur the disturbance will be drastically increased. It can be seen from FIGS. 2A and 2B, in the microchannels with a positive slope (the inlet being deeper than the outlet), because the flow resistance is gradually increased as the bubbles driven by the fluid travel along the microchannel, the position variations between the bubbles become less. In the microchannels with a flat slope, in the beginning there are no significant position variations among the bubbles, but later on the position variations among the bubbles are increased. While in the microchannels with a negative slope (the inlet is shallower than the outlet), since the flow resistance is gradually reduced as the bubbles travel along the microchannel, the leading bubble continuously keeps the leading position and the position variations between the bubbles are increased.

Figure 3A:
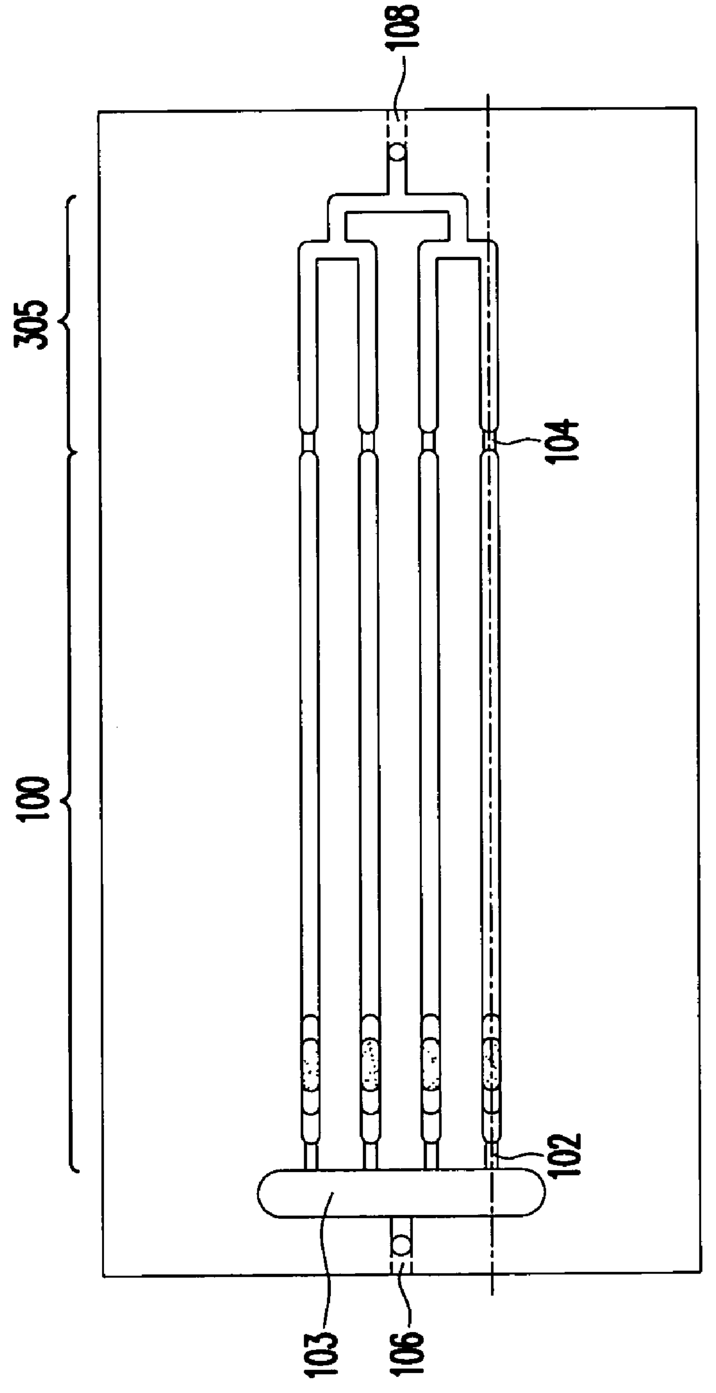
FIG. 3A is the schematic top view of a biochip having microchannels with a positive slope according to an embodiment of the present invention.
Figure 3B:
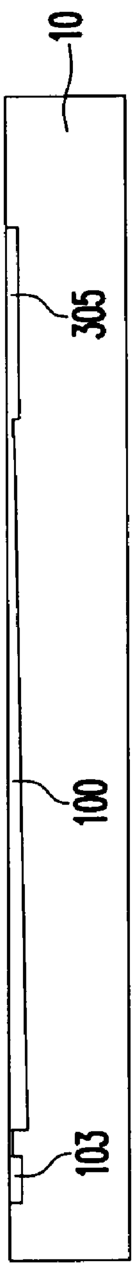
FIG. 3B is the schematic section view of a biochip having microchannels with a positive slope according to an embodiment of the present invention.

Another chip structure is provided by the present invention as shown in FIGS. 3A and 3B, wherein all microchannels in the chip are designed to have a positive slope. The identical parts shown in FIGS. 1A and 1B are marked with the same reference numbers in FIGS. 3A and 3B. In FIGS. 3A and 3B, a collector 305 is employed to substitute the collection pool, and both the inlet 102 and the outlet 104 of the microchannels 100 are designed to be narrower gates.

The chip of the present invention can be used in combination of, for example, a single peristaltic pump (not shown in the figure) for driving the liquid. After the microchannels are filled up by the fluid, the red-ink is injected into the bubbles for observation convenience. As the peristaltic pump drives all the bubbles to move, the flowing process of the bubbles and the fluid in the microchannels can be observed. As shown in FIG. 3A, the bubbles in all microchannels are simultaneously propelled with minor differences. The red-ink in the bubbles is not diffused when propelled by the fluid. Accordingly, the flowing process of the bubbles can be used to simulate the flowing process of the medicament enfolded by the bubbles without diffusion.

In the above embodiment, the microchannels are designed to have a positive slope and the flow resistance of the microchannel is gradually and continuously increased as the fluid moves forward. Thus, flow differences between the microchannels are easily reduced and a steady-state equilibrium is reached. Therefore, the fluid in the microchannels moves substantially in an uniform flow rate.

Figure 4A:
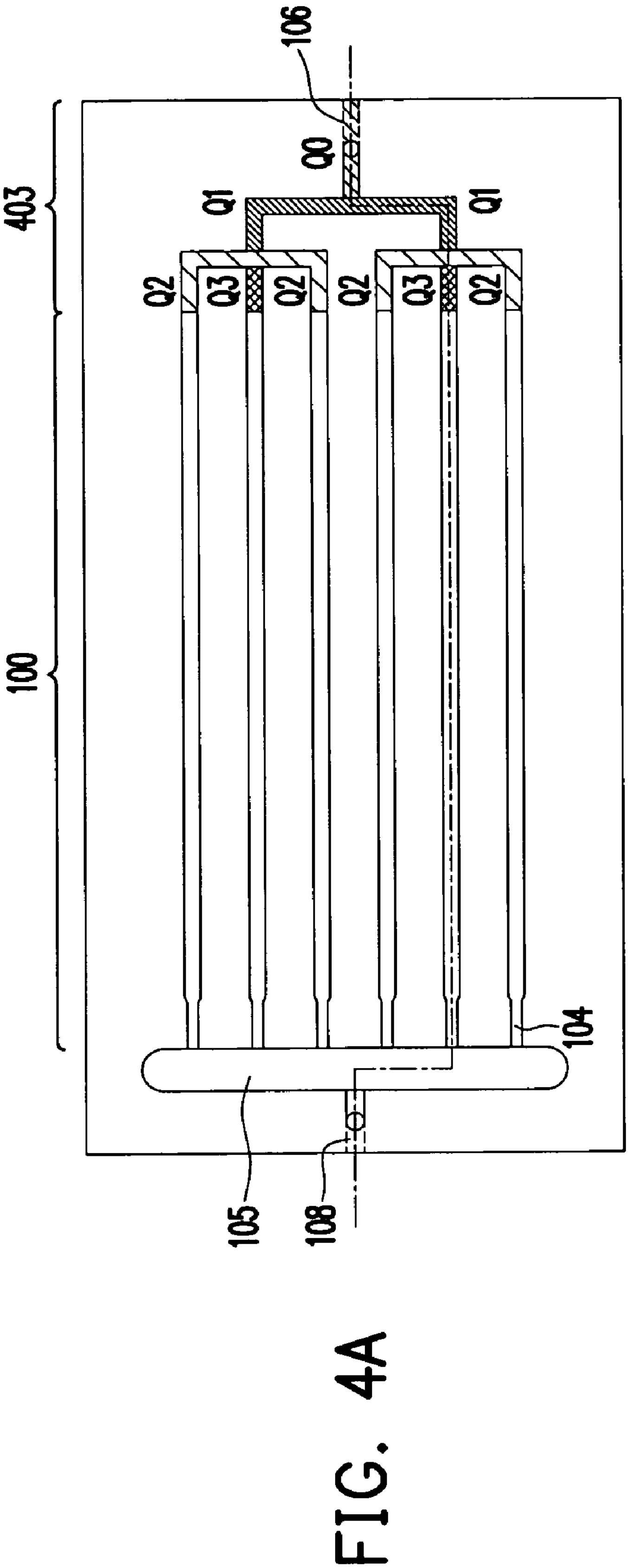
FIG. 4A is the schematic top view of a biochip having microchannels with a flat slope and a multi-splitter according to another embodiment of the present invention.
Figure 4B:
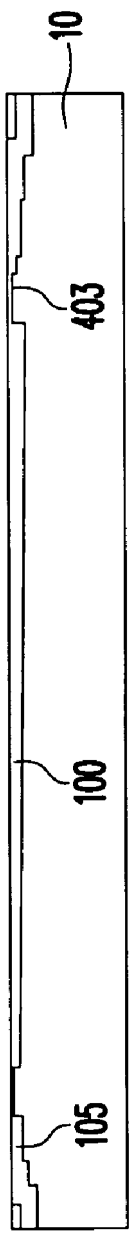
FIG. 4B is the schematic section view of a biochip having microchannels with a flat slope and a multi-splitter according to another embodiment of the present invention.

The biochip of the present invention can be designed with a multi-splitter with a plurality of channels in different depths after the single inflow mouth. This is the case shown in FIGS. 4A and 4B, where the fluid in the multi-splitter is evenly divided and flowed into the parallel microchannels. In FIGS. 4A and 4B, the multi-splitter 403 is employed to substitute the splitting pool, and the multi-splitter 403 is designed to have branched channels in different depths for the liquid to be evenly flowing into the microchannels. Depending on the depths of the channels of the multi-splitter, the flow resistances for the channels in different depths are different. To reach equilibrium, an equation representing the relation between flow resistance and the flow is used to design the multi-splitter, so that the fluid entering the parallel channels of the multi-splitter can be flow-shared and evenly divided to flow into the microchannels.

The flow resistance of the fluid on a plane can be expressed by the following equation, where Q is the flow, W is the channel width, H is the channel depth, ΔP is the hydraulic pressure difference between different positions, μ is the viscosity factor and ΔX is the fluid traveling distance.

$$Q = \frac{WH^3\Delta P}{12\mu\Delta X} \tag{1}$$

According to the law of constant flow over the whole flow path, the following equations can be obtained for the channels of the multi-splitter:

$$Q_0=2(Q_1+2Q_2+Q_3) \tag{2}$$

$$Q_1=2Q_2+Q_3 \tag{3}$$

$$Q_2=Q_3 \tag{4}$$

Where during a flowing process it is assumed that His unchanged, W of channel width is unchanged and the change of ΔP is negligible. After simplifying the equation (1) and replacing the equations (2), (3) and (4) by the simplified equation (1), the following relationships between the depths and the lengths of all the channels of the multi-splitter are given:

$$\frac{H_0^3}{X_0} = 2\left(\frac{H_1^3}{X_1} + 2\frac{H_2^3}{X_2} + \frac{H_3^3}{X_3}\right) \tag{5}$$

$$\frac{H_1^3}{X_1} = 2\frac{H_2^3}{X_2} + \frac{H_3^3}{X_3} \tag{6}$$

$$\frac{H_2^3}{X_2} = \frac{H_3^3}{X_3} \tag{7}$$

Where, $X_0$, $X_1$, $X_2$ and $X_3$ are lengths of the channel. Replacing the $X_0$, $X_1$, $X_2$ and $X_3$ in the equations (5), (6) and (7) by the given values and assuming $H_o$ as a given fixed value, the depth $H_1$, $H_2$, $H_3$ corresponding to each channel are calculated as shown in Table 1. The depths of the channels for the 6-channel multi-splitter and the 10 channel multi-splitter (in three groups) are given in Table 1.

TABLE 1

| | Depth unit (mm) | | | | |
|---|---|---|---|---|---|
| | $H_0$ | $H_1$ | $H_2$ | $H_3$ | $H_4$ |
| 6 channels-Group 1 | 0.5 | 0.444 | 0.284 | 0.218 | |
| 6 channels-Group 2 | 1 | 0.888 | 0.568 | 0.437 | |
| 6 channels-Group 3 | 1.5 | 1.332 | 0.852 | 0.655 | |
| 10 channels-Group 1 | 0.5 | 0.454 | 0.177 | 0.184 | 0.1514 |
| 10 channels-Group 2 | 1 | 0.909 | 0.354 | 0.369 | 0.303 |
| 10 channels-Group 3 | 1.5 | 1.362 | 0.531 | 0.552 | 0.4542 |

In this embodiment, the chip is designed to employ the multi-splitter 403, the incorporated microchannels 100 can be designed to be flat (the slope being zero), as shown in FIG. 4B. Alternatively, the chip with the multi-splitter can incorporate microchannels with the positive slope as well.

Figure 5A:
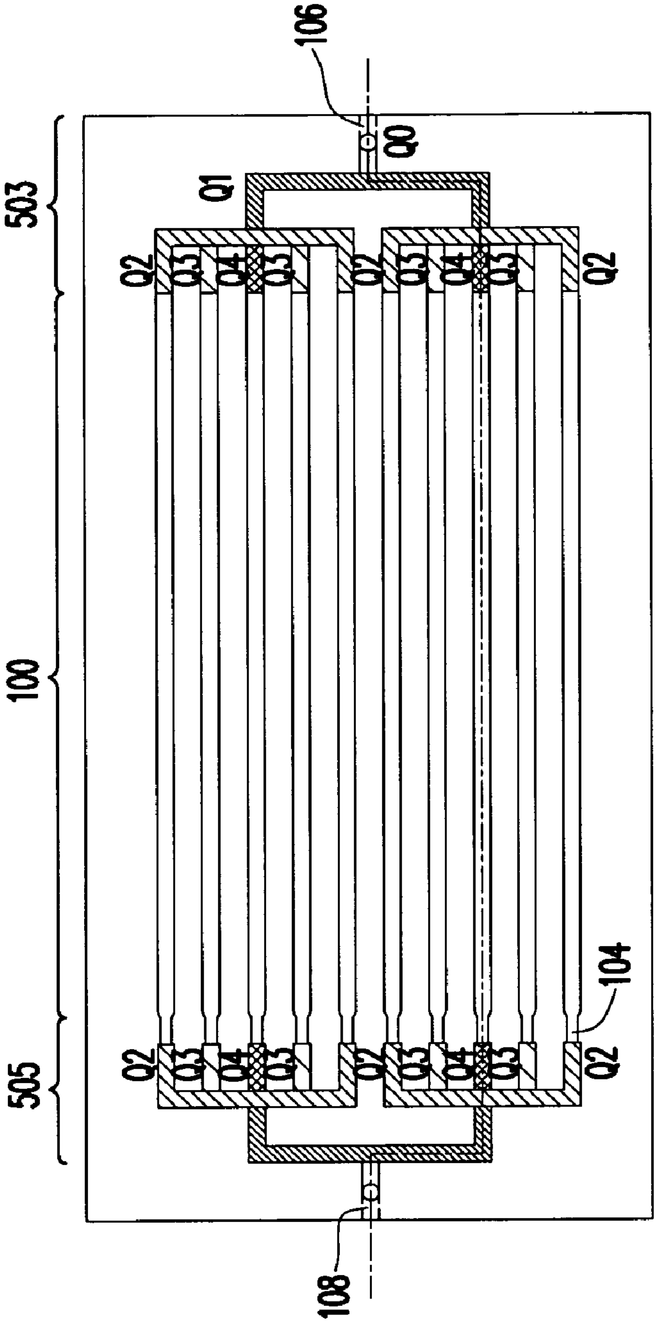
FIG. 5A is the schematic top view of a biochip according to another embodiment of the present invention.
Figure 5B:
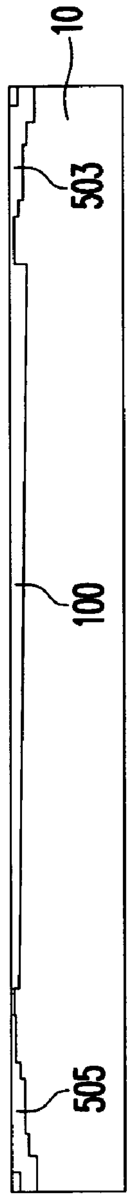
FIG. 5B is the schematic section view of a biochip according to another embodiment of the present invention.

As shown in FIGS. 5A and 5B, the chip is designed to employ multi-splitters 503, 505 respectively connecting to the inlet and the outlet for replacing the splitting pool and the collection pool, so that the fluid is to be evenly flow-shared at both the front end and the rear end. In this regard, the biochip can be designed to have a plurality of microchannels with a positive slope or a flat slope.

The present invention further has the following advantages:

1. Due to the transparent characteristics of plastics and PDMS, it is easy for the optical observation of the cells after reaction with the medicaments. The breath ability and the biological compatibility of PDMS are beneficial for incubating cells. Besides, no sealing is required between PDMS and the substrate for preventing leakage due to the adhesive capability and the elasticity of PDMS.

2. Through a single layer plate and a mono-tube peristaltic pump, the fluid flows uniformly in the plurality of microchannels, thus saving the expensive costs and complicated operation required for using the multi-tube peristaltic pump as the driving source.

3. Using the microchannels with a slope, the projected area remains unchanged, which doesn't affect the number of cells to be adhered to the microchannel.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A biochip with a plurality of microchannels, comprising:

a substrate having a top surface and a bottom surface and having a plurality of microchannels formed on the top surface of the substrate and parallel to each other arranged; and a lid covering the top surface of the substrate, wherein each microchannel has an inlet and an outlet at both ends of the microchannel, the inlet and the outlet are respectively connected to a splitting pool and a collection pool on the top surface of the substrate, and a fluid is able to flow into the splitting pool via an inflow mouth, pass through the microchannels, flow into the collection pool and flow out from an outflow mouth, wherein the microchannels are deeper at the inlet and shallower at the outlet and accordingly have a positive slope.

2. The biochip as recited in claim 1, wherein the substrate is a transparent, plastic, mono-layered plate.

3. The biochip as recited in claim 1, wherein a material of the lid comprises polydimethylsiloxane (PDMS).

4. The biochip as recited in claim 1, wherein the splitting pool comprises a multi-splitter with a plurality of channels in different depths for evenly dividing the fluid to flow into the microchannels.

5. The biochip as recited in claim 1, wherein the collection pool comprises a multi-splitter with a plurality of channels in different depths.

6. The biochip as recited in claim 1, wherein each microchannel has a narrow gate adjacent to the inlet.

7. The biochip as recited in claim 1, wherein each microchannel has a narrow gate adjacent to the outlet.

8. The biochip as recited in claim 1, wherein an angle of the positive slope is approximately between 0.01° and 10°.

9. The biochip as recited in claim 8, wherein the angle of the positive slope is approximately between 0.1° and 3°.

10. A biochip, comprising:

a substrate having a top surface and a bottom surface and having a plurality of microchannels formed on the top surface of the substrate, wherein the microchannels are arranged in parallel; and a lid covering the top surface of the substrate, wherein each microchannel has an inlet and an outlet at both ends of the microchannel, the inlet and the outlet are respectively connected to a splitting pool and a collection pool on the top surface of the substrate, and a fluid is able to flow into the splitting pool via an inflow mouth, pass through the microchannels, flow into the collection pool and flow out from an outflow mouth, wherein the splitting pool comprises a multi-splitter with a plurality of channels in different depths for evenly dividing the fluid to flow into the microchannels.

11. The biochip as recited in claim 10, wherein the microchannels have a positive slope and the positive slope is calculated based on a depth difference between the inlet and the outlet of each of the plurality of the microchannels, so that the microchannels are deeper at the inlet and shallower at the outlet.

12. The biochip as recited in claim 10, wherein the microchannels have a flat slope.

13. The biochip as recited in claim 10, wherein the collection pool further comprises a multi-splitter with a plurality of channels in different depths.

14. The biochip as recited in claim 10, wherein each microchannel has a narrow gate adjacent to the inlet.

15. The biochip as recited in claim 10, wherein each microchannel has a narrow gate adjacent to the outlet.

16. The biochip as recited in claim 11, wherein an angle of the positive slope is approximately between 0.01° and 10°.

17. The biochip as recited in claim 16, wherein the angle of the positive slope is approximately between 0.1° and 3°.

18. The biochip as recited in claim 10, wherein the substrate is a transparent, plastic, mono-layered plate, while a material of the lid comprises polydimethylsiloxane (PDMS).

* * * * *